United States Patent [19]

Shimamoto et al.

[11] Patent Number: 4,652,968
[45] Date of Patent: Mar. 24, 1987

[54] NON-AQUEOUS LIQUID ELECTROLYTE FOR ELECTROLYTIC CAPACITORS AND ELECTROLYTIC CAPACITORS USING SAME

[75] Inventors: Hideki Shimamoto, Osaka; Yoshio Miyazaki, Kyoto; Yoichi Aoshima, Osaka; Tsuyoshi Tsunetsugu; Hisao Nagara, both of Kyoto; Yoshiteru Kuwae, Amagasaki; Kazushi Shiono, Kyoto, all of Japan

[73] Assignees: Matsushita Electric Industrial Co., Ltd.; Sanyo Chemical Industries, Ltd., both of Japan

[21] Appl. No.: 882,674

[22] Filed: Jul. 7, 1986

[30] Foreign Application Priority Data

Jul. 8, 1985 [JP] Japan .................................. 60-149602

[51] Int. Cl.⁴ .............................................. H01G 9/02
[52] U.S. Cl. ..................................... 361/319; 252/62.2
[58] Field of Search ............... 252/62.2, 567, 575–579; 361/311–315, 319, 433

[56] References Cited

U.S. PATENT DOCUMENTS

| 2,994,809 | 8/1961 | Jenny et al. | 252/62.2 X |
| 3,931,552 | 1/1976 | Anderson et al. | 252/62.2 X |
| 3,937,664 | 2/1976 | Tanimoto et al. | 361/315 X |
| 4,535,382 | 8/1985 | Wada et al. | 361/319 |

FOREIGN PATENT DOCUMENTS

| 17496 | 1/1969 | Japan | 252/576 |
| 993587 | 5/1965 | United Kingdom | 361/433 E |

Primary Examiner—Donald A. Griffin
Attorney, Agent, or Firm—Lowe, Price, Leblanc, Becker & Shur

[57] ABSTRACT

Non-aqueous liquid electrolytes for electrolytic capacitors which comprise diazobicyclealkenes and/or salts thereof as a solute. The electrolytes are effective in improving low temperature and high temperature characteristics when applied as electrolytic capacitors. The capacitors using the electrolytes are also described.

20 Claims, 4 Drawing Figures

NON-AQUEOUS LIQUID ELECTROLYTE FOR ELECTROLYTIC CAPACITORS AND ELECTROLYTIC CAPACITORS USING SAME

BACKGROUND OF THE INVENTION

1. Field of the Invention

This invention relates to electrolytic capacitors and more particularly, to non-aqueous liquid electrolytes for aluminum electrolytic capacitors.

2. Description of the Prior Art

Typical electrolytes for electrolytic capacitors are those electrolytes which comprise ionogens dissolved in ethylene glycol. This type of electrolytic capacitor is disadvantageous in relatively poor electrolytic characteristics at low temperatures. In order to overcome the above disadvantage, there has been proposed in Japanese Laid-open patent application No. 54-104559 an electrolyte in which phthalates are dissolved in a mixed solvent of dimethylformamide and ethylene glycol. Japanese Laid-open patent application No. 54-7564 describes an electrolyte which contains amine salts of maleic acid dissolved in a mixed solvent of γ-butyleacetone and ethylene glycol. However, these electrolytes have the respective drawbacks. More particularly, the electrolyte using dimethylformamide is apt to pass through a sealing rubber material and has a short life on drying-up at high temperatures. On the other hand, the solvent mainly composed of γ-butyleacetone is unlikely to pass through a sealing material and is expected to have a long life at high temperatures. However, when there are used solutes which are obtained by neutralizing maleic acid with amines, a high specific conductance cannot be expected.

SUMMARY OF THE INVENTION

It is accordingly an object of the invention to provide improved electrolytes which comprise, as a solute, specific types of compounds, so that capacitors using the electrolytes have improved low temperature characteristics with improved high temperature characteristics over a long time.

It is another object of the invention to provide electrolytes which can provide electrolytic capacitors having stable characteristic properties over a wide temperature range and a long life.

It is a further object of the invention to provide electrolytes in which diazobicyclealkenes and/or salts thereof are used as a solute by which a high specific conductance is ensured with an improved dissipation or dielectric loss at low to high temperatures.

The above objects can be achieved, according to the invention, by a non-aqueous liquid electrolyte for electrolytic capacitors which comprises, in a chemically and thermally stable solvent, at least one solute selected from the group consisting of diazobicyclealkenes of the following formula, and salts thereof,

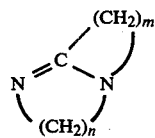

in which m is an integer of from 2 to 11, n is an integer of from 2 to 6, and both rings are independently unsubstituted or substituted with a lower alkyl group.

A capacitor using the above electrolyte should preferably have at least one aluminium electrode having a dielectric film formed thereon, and the electrolyte defined above.

DETAILED DESCRIPTION AND EMBODIMENTS OF THE INVENTION

Figure 1:
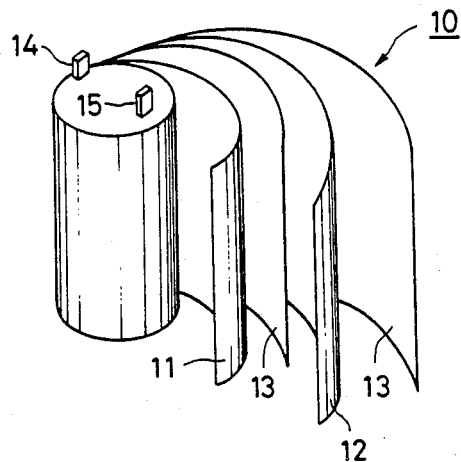
FIG. 1 is a schematic view of a wound electrolytic capacitor section to which the present invention is applicable.

The present invention is characterized by using, as a solute, diazobicyclealkenes having the formula defined before and/or salts thereof. In the formula, it is preferred that m is an integer of from 3 to 5, and n is an integer of 2 or 3. The diazobicyclealkenes of the aforeindicated formula may be those described in Japanese Patent Publication No. 46-37503, which is incorporated herein by reference. Preferable examples of the diazobicyclealkenes include 1,8-diazobicycle[5.4.0]undecene-7, 1,5-diazobicycle[4.3.0]nonene-5, 1,8-diazobicycle[5.3.0]decene-7, 1,4-diazobicycle[3.3.0]octene-4, 10-methyl-1,8-diazobicycle[5.4.0]undecene-7, 3-methyl-1,5-diazobicycle[4.3.0]nonene-5, and mixtures thereof. Most preferably, 1,8-diazobicycle[5.4.0]undecene-7 and 1,5-diazabicyclo[4.3.0]nonene-5 are mentioned.

The salts of the diazabicycloalkenes may be those salts obtained from acids including inorganic and organic acids. Examples of the inorganic acids include boric acid, phosphoric acid, polyphosphoric acid and the like. Examples of the organic acids are: (1) carboxylic acids including (A) polycarboxylic acids (dibasic to tetrabasic polycarboxylic acids) which include (a) aliphatic saturated polycarboxylic acids such as oxalic acid, malonic acid, succinic acid, glutaric acid, adipic acid, pimelic acid, suberic acid, azelaic acid, sebacic acid, and the like, (b) aliphatic unsaturated polycarboxylic acids such as maleic acid, fumaric acid, itaconic acid and the like, and (c) aromatic polycarboxylic acids such as phthalic acid, isophthalic acid, terephthalic acid, trimellitic acid, pyromellitic acid and the like, (B) monocarboxylic acids having from 1 to 30 carbon atoms which include (a) saturated monocarboxylic acids such as formic acid, acetic acid, propionic acid, butyric acid, isobutyric acid, valeric acid, caproic acid, enanthic acid, caprylic acid, pelargonic acid, lauric acid, myristic acid, stearic acid, behenic acid and the like, (b) unsaturated monocarboxylic acids such as acrylic acid, methacrylic acid, oleic acid and the like, (C) oxycarboxylic acids which include (a) aliphatic oxycarboxylic acids such as glycolic acid, lactic acid, tartaric acid and the like, and (b) aromatic oxycarboxylic acids such as salicyclic acid, mandelic acid and the like, and (D) sulfur-containing polycarboxylic acids such as thiodipropionic acid; (2) phenols including, for example, monohydric phenols, e.g. phenols and naphthols, which include phenol, alkylphenols such as cresol, xylenol, ethylphenol, n and iso-propylphenol, n and iso-amylphenol, iso-nonylphenyl, iso-dodecylphenol and the like, methoxyphenols such as eugenol, guaiacol and the like, naphthol and cyclohexylphenol, and polyhydric phenols such as catechol, resorcin, pyrogallol, phloroglucinol and the like; (3) sulfonic acids such as paratoluenesulfonic acid, dodecylbenzenesulfonic acid sulfosalicylic acid, and the like; and (4) mixtures thereof.

Of these acids, phthalic acid, maleic acid and mixtures thereof are preferred.

The ratio by equivalent of a diazobicyclealkeness and an acid is generally in the range of 1:0.1 to 1:5, preferably from 1:0.3 to 1:1.5.

The solvents for the diazobicyclealkenes and/or salts thereof may be γ-butyleacetone or mixtures thereof with other solvents. In the mixed solvents, solvents to be mixed with γ-butyleacetone include, for example, monohydric alcohols such as propyl alcohol, butyl alcohol, amyl alcohol and the like, polyhydric alcohols such as ethylene glycol, propylene glycol, glycerine and the like, ethers such as ethylene glycol monoethyl ether, ethylene glycol monobutyl ether, ethylene glycol dimethyl ether, diethylene glycol dimethyl ether and the like, amides such as N-methylformamide, N,N-dimethylformamide, N,N-diethylformamide, N,N-diethylacetoamide, and the like, sulfoxide such as dimethylsulfoxide, oxazolidines such as 3-methyl-1,3-oxazolidin-2-one, 3-ethyl-1,3-oxazolidin-2-one and the like, and mixtures thereof.

Of these, 3-methyl-1,3-oxazolidin-2-one, ethylene glycol and mixtures thereof are preferred.

The solvent mixed with γ-butyleacetone is used in amounts not greater than 90% by weight, preferably not greater than 50% by weight, of the total amount of a mixed solvent.

The amount of the diazobicyclealkene and/or a salt threof is generally in the range of from 1 to 50% by weight, preferably from 5 to 30% by weight, of the solvent used. In other words, the electrolyte comprises from 1 to 35% by weight, preferably from 5 to 25% by weight, of a diazobicyclealkene and/or a salt thereof and, correspondingly, from 99 to 65% by weight, preferably 95 to 75% by weight, of a solvent for the diazabicycloalkene and/or salt thereof. The solvent may be γ-butyleacetone or a mixture of γ-butyleacetone and up to 90% by weight, preferably up to 50%, by weight of other solvents indicated above.

If the amount of the diazobicyclealkenes and/or salts thereof is less than 1% by weight, the electric conductivity is not satisfactory. Over 50% by weight, low temperature characteristics are not improved further.

Diazobicyclealkenes have an amidine structure of N=C=N, in which electrons are not localized and which are not expected in ordinary amines. When the alkenes are ionized, the proton is stabilized by resonance and is thus considered to exhibit strong basicity. Presumably, this results in promotion of dissociation of a weak acid and thus, a high specific conductance is obtained. It is also considered that since the alkenes are cyclic in structure, they are unlikely to decompose even at high temperatures with a long-term stability.

Referring now to the drawings, and in particular to FIG. 1, there is schematically shown a partially unrolled capacitor roll 10 of a conventional construction. The capacitor 10 comprises a pair of electrode foils 11, 12 at least one of which is made of a suitable film-forming valve metal such as aluminium, which has a dielectric oxide film thereon. The oxide film may be formed by anodizing processes known in the art. The electrode foils 11, 12 are separated from each other by means of dielectric spacers 13 which are composed, for example, of paper. These spacers 13 are impregnated with the electrolyte of the present invention. Terminals 14, 15 are secured to the respective electrode foils and extend in the same or opposite directions. The electrodes foils 11, 12 and the dielectric sheets 13 are convolutely wound into a roll and placed into a casing not shown.

The electrolyte of the present invention may be used in other types of electrolytic capacitors known in the art. For instance, the electrolyte of the invention may be applied to a wire capacitor, in which the anode is a filmforming wire having a dielectric oxide formed thereon.

The present invention is described in more detail by way of examples.

EXAMPLES 1-6 AND COMPARATIVE EXAMPLES 1-3

Electrolytic capacitors of the formulations indicated in Table 1 below were prepared and subjected to measurement of a specific conductance at normal temperatures. The results are shown in Table 1 below.

TABLE 1

| Electrolytic Compositions (parts by weight) | | Specific Conductance (mS/cm, 30° C.) |
|---|---|---|
| Example: | | |
| 1 γ-butyleacetone | 100 | 7.0 |
| maleic acid | 10 | |
| 1,8-diazabicyclo[5.4.0]undecene-7 | 13 | |
| 2 γ-butyleacetone | 100 | 5.2 |
| phthalic acid | 15 | |
| 1,8-diazabicyclo[5.4.0]undecene-7 | 13 | |
| 3 γ-butyleacetone | 100 | 9.5 |
| maleic acid | 10 | |
| 1,5-diazabicyclo[4.3.0]nonene-5 | 11 | |
| 4 γ-butyleacetone | 100 | 6.5 |
| phthalic acid | 15 | |
| 1,5-diazabicyclo[4.3.0]nonene-5 | 11 | |
| 5 γ-butyleacetone | 90 | 8.5 |
| ethylene glycol | 10 | |
| maleic acid | 10 | |
| 1,8-diazabicyclo[5.4.0]undecene-7 | 13 | |
| 6 γ-butyleacetone | 90 | 7.6 |
| 3-methyl-1,3-oxazolidin-2-on | 10 | |
| maleic acid | 10 | |
| 1,8-diazabicyclo[5.4.0]undecene-7 | 13 | |
| Comparative Example: | | |
| 1 N,N—dimethylformamide | 70 | 5.8 |
| ethylene glycol | 30 | |
| ammonium borodisalicylate | 15 | |
| 2 γ-butyleacetone | 100 | 5.0 |
| maleic acid | 10 | |
| triethylamine | 9 | |
| 3 γ-butyleacetone | 100 | 3.4 |
| phthalic acid | 15 | |
| triethylamine | 9 | |

The electrolytes indicated in Table 1 were each used in an aluminium electrolytic capacitor having, respectively, a rated voltage and a capacity of 10 V and 47 μF with a size of 5 mm in diameter and 11 mm in length. The respective capacitors were subjected to measurements of a capacitance and an impedance at normal and low temperatures of 20° and −55° C.

The results are shown in Table 2 below, in which low temperature characteristics are represented by ratios to the normal temperature characteristics and tan δ is a tangent of the loss angle. The values in the figure are each an average of ten measurements.

TABLE 2

|  | 20° C. | | −55° C. | |
| --- | --- | --- | --- | --- |
|  | Capacitance (f = 120 Hz, μF) | tan δ (f = 120 Hz, %) | ΔC/ΔC$_{20°}$ C. (%) | Z/Z$_{20°}$ C. (f = 120 Hz) |
| Example: | | | | |
| 1 | 47.0 | 9.9 | −17 | 2.0 |
| 2 | 46.9 | 13.2 | −22 | 2.6 |
| 3 | 46.7 | 8.8 | −13 | 1.7 |
| 4 | 47.0 | 11.4 | −19 | 2.2 |
| 5 | 47.1 | 9.3 | −19 | 2.3 |
| 6 | 46.8 | 9.6 | −15 | 1.9 |
| Comparative Example: | | | | |
| 1 | 45.9 | 12.5 | −24 | 3.0 |
| 2 | 46.1 | 13.8 | −24 | 2.7 |
| 3 | 46.8 | 19.1 | −30 | 3.8 |

As will be apparent from the above results of Tables 1 and 2, the electrolytes of the invention have higher specific conductances than the known electrolytes. This results in a reduced loss of the capacitors at normal temperatures. In addition, the capacitors of the invention have less reduced characteristics at the low temperatures.

Figure 2:
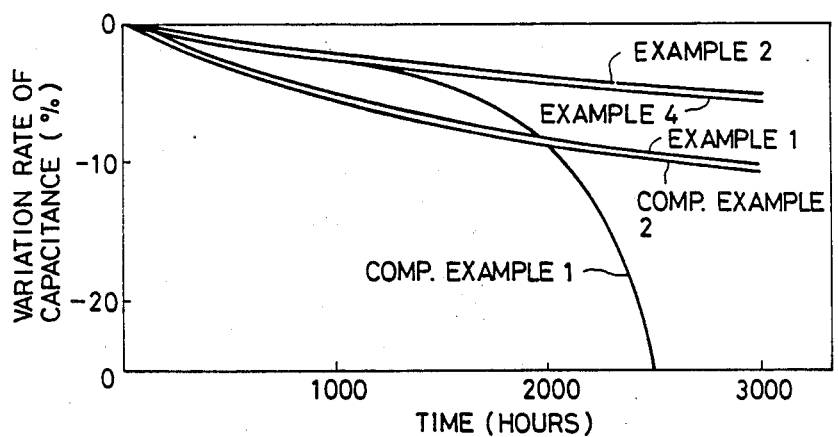
FIG. 2 is a graphical representation of a variation rate of capacitance in relation to time for different electrolytic capacitors of the invention and for comparison.
Figure 3:
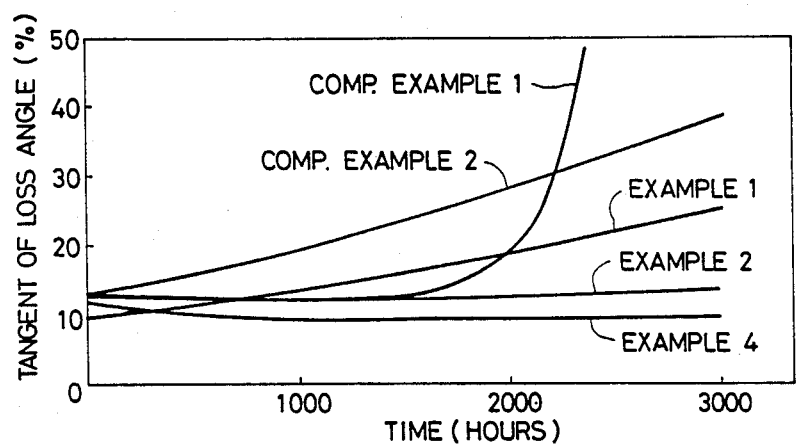
FIG. 3 is a graphical representation of a tangent of the loss angle in relation to time for different electrolytic capacitors of the invention and for comparison.
Figure 4:
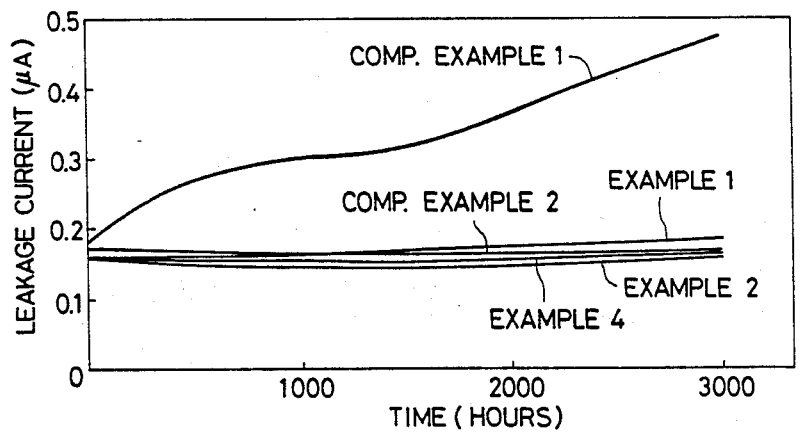
FIG. 4 is a graphical representation of a leakage current in relation to time for different electrolytic capacitors of the invention and for comparison.

Moreover, the electrolytic capacitors using the electrolytes of Examples 1, 2 and 4 and Comparative Examples 1 and 2 were subjected to a life test at a high temperature of 105° C. over 3000 hours. In the test, each capacitor was measured with respect to the capacitance, tangent of the loss angle and leakage current. The capacitance and the tangent were determined by application of a rated voltage to the respective capacitors and the leakage current was determined without application of a voltage. The results are shown in FIGS. 2 through 4, which reveal that the life characteristics of the capacitors of the invention are equal or superior to those characteristics of the prior art capacitors. Especially, the phthalates of 1,8-diazabicyclo[5.4.0]undecene-7 and 1,5-diazabicyclo[4.3.0]nonene-5 are more effective in prolongation of the life at high temperatures.

As will be seen from the above results, the diazobicyclealkenes and salts thereof ensure high specific conductances on use as a solute of electrolyte and can improve the tangent of the loss angle of capacitors. Since the alkenes have a cyclic structure, they are rather unlikely to decompose at high temperatures. Thus, the capacitors using the electrolytes of the invention are stable over a wide temperature range.

What is claimed is:

1. A non-aqueous liquid electrolyte for electrolytic capacitors which comprises, in an inert solvent, at least one compound serving as a solute and selected from the group consisting of diazobicyclealkenes of the following formula, and salts thereof,

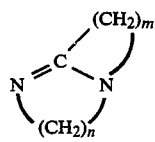

in which m is an integer of from 2 to 11, n is an integer of from 2 to 6, and both rings are independently unsubstituted or substituted with a lower alkyl group.

2. A non-aqueous liquid electrolyte according to claim 1, wherein, in the formula, m is from 3 to 5 and n is 2 to 3.

3. A non-aqueous liquid electrolyte according to claim 1, wherein said at least one compound is 1,8-diazabicyclo[5.4.0]undecence-7.

4. A non-aqueous liquid electrolyte according to claim 1, wherein said at least one compound is 1,5-diazabicyclo[4.3.0]nonene-5.

5. A non-aqueous liquid electrolyte according to claim 1, wherein said at least one compound is a salt of the diazobicyclealkeane with phthalic acid, maleic acid or a mixture thereof.

6. A non-aqueous liquid electrolyte according to claim 1, wherein said solvent is γ-butyleacetone.

7. A non-aqueous liquid electrolyte according to claim 1, wherein said solvent is a mixed solvent comprising γ-butyleacetone.

8. A non-aqueous liquid electrolyte according to claim 7, wherein said mixed solvent is a mixture of γ-butyleacetone and a compound selected from the group consisting of 3-methyl-1,3-oxazolidin-2-one, ethylene glycol and mixtures thereof.

9. A non-aqueous liquid electrolyte according to claim 1, wherein said solute is contained from 1 to 35 wt% of the electrolyte.

10. A non-aqueous liquid electrolyte according to claim 9, wherein said solute is contained in an amount of from 5 to 25 wt% of the electrolyte.

11. An electrolytic capacitor comprising at least one film-forming metal electrode having a dielectric film formed thereon, and a non-aqueous liquid electrolyte which comprises, in an inert solvent, at least one compound serving as a solute and selected from the group consisting of diazobicyclealkenes of the following formula, and salts thereof,

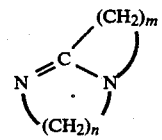

in which m is an integer of from 2 to 11, n is an integer of from 2 to 6, and both rings are independently unsubstituted or substituted with a lower alkyl group.

12. An electrolytic capacitor according to claim 11, wherein, in the formula, m is from 3 to 5 and n is 2 or 3.

13. An electrolytic capacitor according to claim 11, wherein said at least one compound is 1,8-diazabicyclo[5.4.0]undecence-7.

14. An electrolytic capacitor according to claim 11, wherein said at least one compound is 1,5-diazabicyclo[4.3.0]nonene-5.

15. An electrolytic capacitor according to claim 11, wherein said at least one compound is a salt of the diazabicycloalkene with phthalic acid, maleic acid or a mixture thereof.

16. An electrolytic capacitor according to claim 11, wherein said solvent is γ-butyleacetone.

17. An electrolytic capacitor according to claim 11, wherein said solvent is a mixed solvent comprising γ-butyleacetone.

18. An electrolytic capacitor according to claim 17, wherein said mixed solvent is a mixture of γ-butyleacetone and a compound selected from the group consisting of 3-methyl-1,3-oxazolidin-2-one, ethylene glycol and mixtures thereof.

19. An electrolytic capacitor according to claim 11, wherein said solute is contained from 1 to 35 wt% of the electrolyte.

20. An electrolytic capacitor according to claim 19, wherein said solute is contained in an amount of from 5 to 25 wt% of the electrolyte.

* * * * *

UNITED STATES PATENT AND TRADEMARK OFFICE
CERTIFICATE OF CORRECTION

PATENT NO. : 4,652,968

DATED : March 24, 1987

INVENTOR(S) : Hideki Shimamoto et al.

It is certified that error appears in the above-identified patent and that said Letters Patent is hereby corrected as shown below:

Cover page, [52] Abstract, line 2, "diazobicyclealkenes" should read --diazabicycloalkenes--;

Column 1, lines 23 and 24, "r-butyleacetone" should read --r-butyrolactone--;

Column 1, line 29, "r-butyleacetone" should read --r-butyrolactone--;

Column 1, lines 48 and 56, "diazobicyclealkenes" should read --diazabicycloalkenes--;

Column 2, lines 24, 27 and 31, "diazobicyclealkenes" should read --diazabicycloalkenes--;

Column 2, lines 31, 32, 33(both occurrences), 34, 35 and 36, "diazobicycle" should read --diazabicyclo--;

Column 3, lines 12, 15, 37, 42, 49 and 53, "diazobicyclealkene(s)" should read --diazabicycloalkene(s)--;

Column 3, lines 16, 18 and 33, "r-butyleacetone" should read --butyrolactone--;

Column 4, Table 1, "r-butyleacetone" should read --r-butyrolactone-- in Examples 1 to 6 and Comparative Examples 1 to 3.

Column 5, lines 47, 48 and 59, "diazobicyclealkenes" should read --diazabicycloalkenes--;

Column 6, line 15, "diazobicyclealkeane" should read --diazabicycloalkene--;

Column 6, lines 18, 21, 24, 65 and 68, "r-butyleacetone" should read --r-butyrolactone--;

Column 6, line 39, "diazobicyclealkenes" should read --diazabicycloalkenes--; and

UNITED STATES PATENT AND TRADEMARK OFFICE
CERTIFICATE OF CORRECTION

PATENT NO. : 4,652,968

DATED : March 24, 1987

INVENTOR(S) : Hideki Shimamoto et al.

It is certified that error appears in the above-identified patent and that said Letters Patent is hereby corrected as shown below:

Column 7, lines 2 and 3, "r-butyleacetone" should read

-- r-butyrolactone --.

Signed and Sealed this

Tenth Day of November, 1987

Attest:

DONALD J. QUIGG

Attesting Officer

Commissioner of Patents and Trademarks